United States Patent [19]

Reed et al.

[11] Patent Number: 4,528,944
[45] Date of Patent: Jul. 16, 1985

[54] ANIMAL EXERCISING HARNESS

[76] Inventors: Robert C. Reed; Max Reed, both of 3314 N. 67th St., Scottsdale, Ariz. 85251

[21] Appl. No.: 624,698

[22] Filed: Jun. 26, 1984

[51] Int. Cl.³ .............................................. A01K 15/02
[52] U.S. Cl. ...................... 119/29; 119/96; 54/71
[58] Field of Search .................. 119/126, 127, 128, 96, 119/106, 109, 29; 54/71

[56] References Cited

U.S. PATENT DOCUMENTS

| | | | |
|---|---|---|---|
| 142,871 | 9/1873 | Schmalhauser | 54/71 |
| 216,705 | 6/1879 | Smith | 54/71 |
| 369,294 | 8/1887 | Moose | 54/71 |
| 382,869 | 5/1888 | Fales | 54/71 |
| 398,683 | 2/1889 | Whitten | 54/71 |
| 444,032 | 1/1891 | Whitaker | 54/71 |
| 580,965 | 4/1897 | Weathers | 54/71 |
| 730,360 | 6/1903 | Forsyth | 54/71 |
| 1,508,601 | 9/1924 | Huff | 119/96 |
| 1,685,435 | 9/1928 | Philbrick | 119/96 |
| 2,534,727 | 12/1950 | Moyle | 54/71 |
| 2,670,712 | 3/1954 | Patience et al. | 54/71 |
| 2,826,172 | 3/1958 | Buckle et al. | 119/96 |
| 3,099,250 | 7/1963 | Soles, Jr. | 119/106 X |
| 3,994,264 | 11/1976 | Flynt | 119/96 |

Primary Examiner—Hugh R. Chamblee
Attorney, Agent, or Firm—LaValle D. Ptak

[57] ABSTRACT

An exercising device for animals, such as dogs, horses, and the like, comprises a harness for attachment to the chest region of the animal. First and second leg bands are attached to the rear legs of the aninal at its hocks, and an elastic cord interconnects these first and second leg bands with the harness through a pulley attached to the harness in the chest region of the animal. The length and tension of the elastic cord are selected to cause additional dynamic tension to be applied between the rear legs and the chest of the animal when the animal is walking and running, while at the same time permitting normal movement of the animal. Thus, increased exercise and muscle build-up of the animal occurs under all conditions of exercise of such animal.

13 Claims, 5 Drawing Figures

U.S. Patent  Jul. 16, 1985  4,528,944
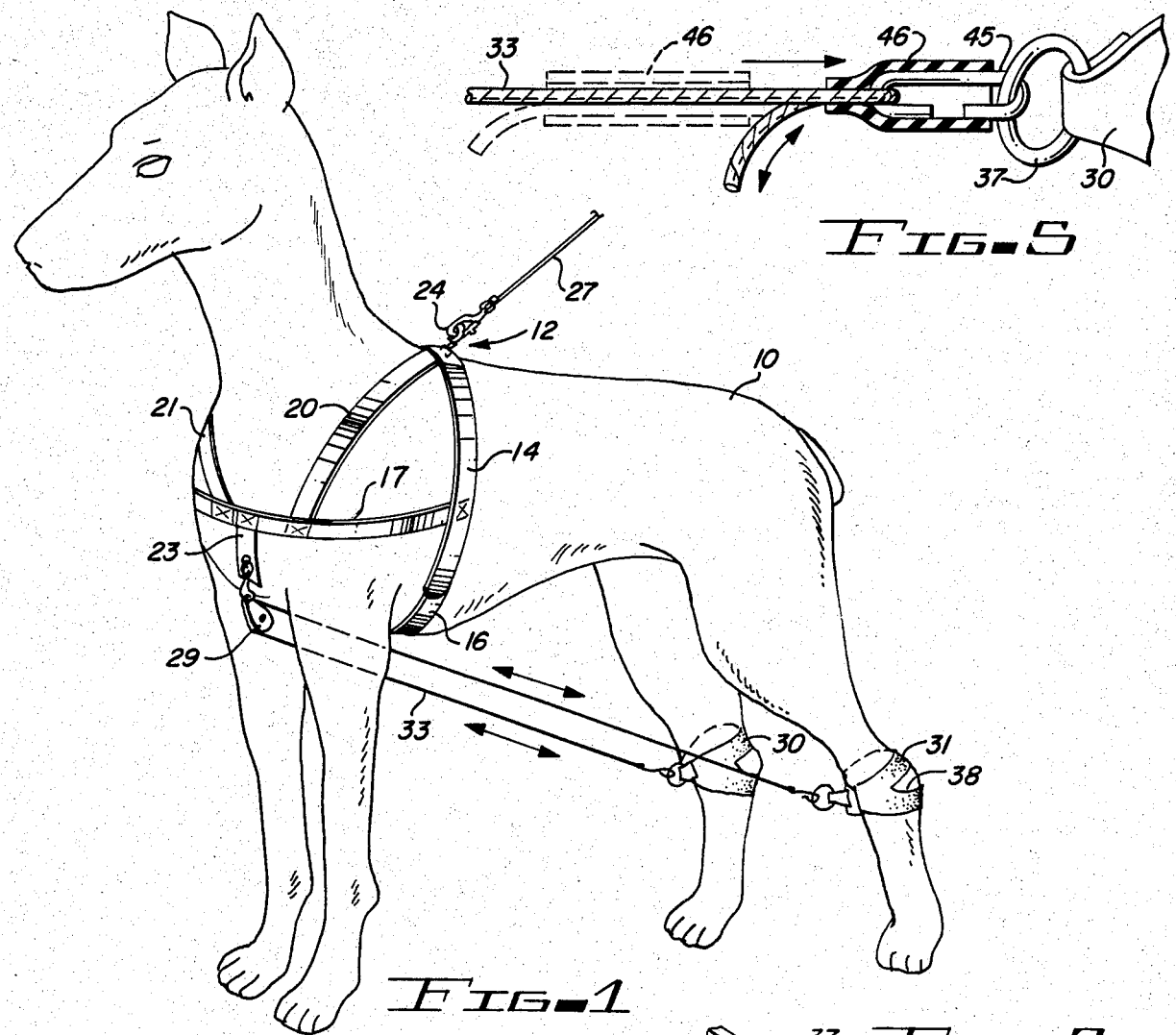
FIG-5
FIG-1
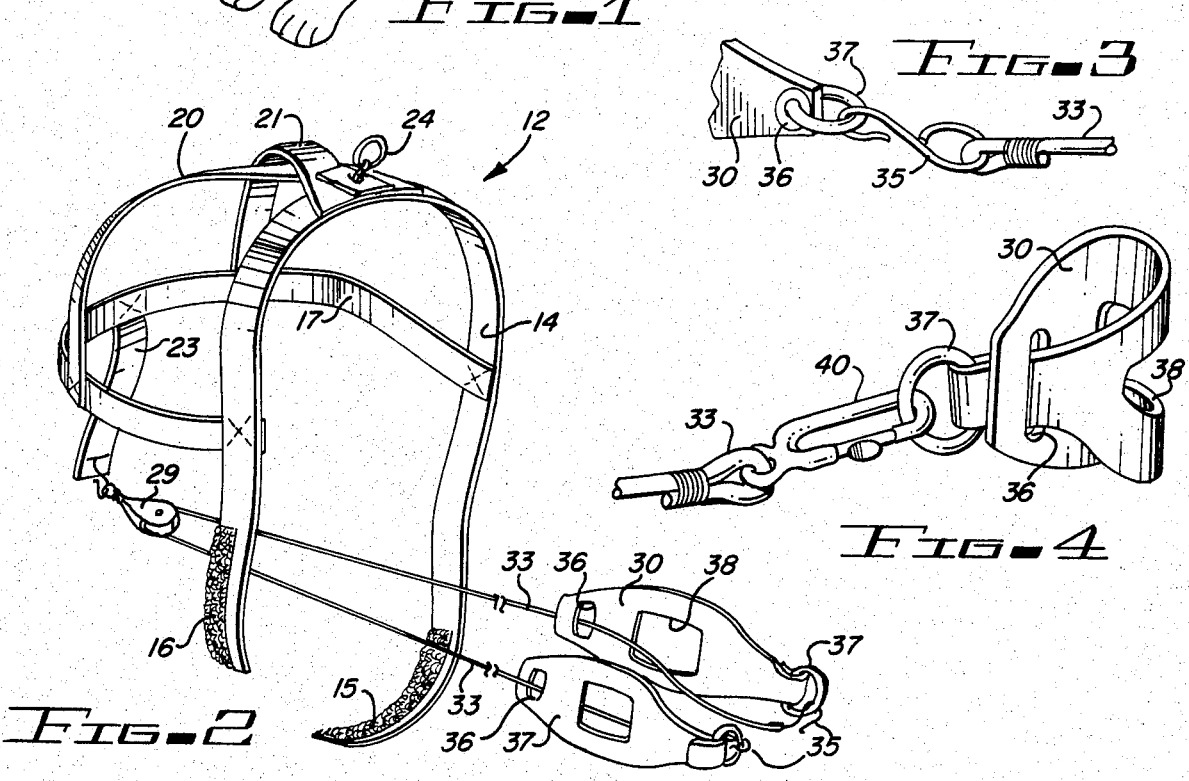
FIG-3
FIG-4
FIG-2

ANIMAL EXERCISING HARNESS

BACKGROUND OF THE INVENTION

Throughout the world, dogs are kept as pets; and on farms and ranches, dogs are frequently trained for performing a variety of useful work tasks. In addition, sportsmen, particularly bird hunters, long have trained dogs to assist them in hunting by locating and retrieving game. In addition, it is becoming increasingly popular to breed dogs for competition in dog shows, where the conformation and other characteristics of the dogs are judged according to pre-established standards.

Most dogs are very active animals. To maintain them in their peak physical condition, most require a great deal of exercise. Unfortunately, with increasing numbers of dogs being kept in homes or apartments in cities, the necessary exercise to keep a dog in such peak physical condition becomes increasingly difficult to obtain. Most city dwellers do not have room to allow their dogs to roam over a wide territory. In fact, in most cities, "leash laws" and other legal limitations severely restrict the movement and freedom which dogs have. The result of this is that many dogs presently kept as pets today, and trained for exhibit in dog shows or for use as hunting dogs and the like, are in poor physical condition. This frequently results in two extreme types of conduct on the part of the dog. Some dogs become very hyperactive and it is nearly impossible to keep them in the confined environment to which they are subjected. As a result, they are difficult to train and discipline. Other dogs react to reduced exercise restrictions in an opposite manner and become very lethargic or lazy and tired. Both of these conditions are abnormal and undesirable.

For show dogs, the lack of exercise generally is manifested in poor physical conformation with the resultant poor placements in dog shows in which such dogs are entered. Consequently, it is desirable to find some way to avoid the results of insufficient exercise.

With the increased popularity of horseback-riding and the breeding and raising of horses for competition in horse shows, a similar situation also arises with respect to horses. Many horse owners keep horses in locations which make it impossible to properly exercise the horse. It is well-known that a horse requires a relatively large area in which to run if the animal is to be maintained in peak physical condition. Unfortunately, many horses are kept on relatively small pieces of property in or near large cities, which precludes them from obtaining the necessary normal exercise which they would obtain if raised in locations where they have a relatively large area in which to roam or to be ridden.

It also has been found in the training of both dogs and horses that it sometimes is necessary to employ some type of restraining device in order to facilitate and implement the desired training. To this end, a variety of training or restraining devices have been developed in the past. In the case of horses which are subject to kicking (particularly with their rear legs), and with respect to hyperactive dogs or dogs which jump over fences used to confine them, a variety of restraining devices have been developed in the past.

One such dog-restraining harness for the purpose of absolutely limiting the rearward movement of the dog's legs relative to the rest of its body (to keep it from jumping out of an enclosure) is disclosed in the patent of Flynt, U.S. Pat. No. 3,944,264. The restraining harness disclosed in this patent includes loops which extend from the collar around the dog's neck under its chest to the back legs. The harness is inextendable and absolutely limits the rearward movements of the dog's legs to prevent it from jumping. Another dog harness employing a similar principle (but for both the front and back legs) is disclosed in the patent to Moyle, U.S. Pat. No. 2,534,727. Once again, inextendable straps are connected to a harness and around all four legs of the dog to limit the movement of the dog's legs. This is for the purpose of fettering the dog to keep it from running fast or to prevent it from jumping over fences and the like. Since the devices of both of these patents restrain normal movement of the dogs, they are not helpful in exercising the dog to build muscle tone or strength, and in addition, are uncomfortable to the dog. While they may serve the limited purpose of a very narrow specific training function (that is, preventing jumping), they are of no overall general value in the exercising and developing of the dogs on which they are used.

Training harnesses or movement-restricting harnesses of the general type disclosed in U.S. Pat. No. 3,994,264 Flynt also have been developed for use in training or restraining horses. Six patents which disclose somewhat similar devices for this purpose are the patents to Forsyte, U.S. Pat. No. 730,360; Weathers U.S. Pat. No. 580,965; Smith, U.S. Pat. No. 216,705; Moose, U.S. Pat. No. 369,294; Fales, U.S. Pat. No. 382,869; and Whitten, U.S. Pat. 389,683. All of these patents are similar. All of them use an inextendable restraining rope or strap extending from the hock on one hind leg through a ring or pulley to the hock on the other hind leg of the horse. The ring or pulley is connected to a harness over the middle of the horse (similar to a girth), or to a collar around the neck of the horse.

The devices are used to prevent the horses from kicking to the rear or to prevent unwanted movement of the legs of the horse. None of these devices, however, are effective for building muscle tone or for exercising the horse on which they are used.

It is desirable to provide an exercising harness for animals, such as dogs and horses, which may be comfortably worn by the animal and which is capable of exercising the animal to build muscle tone in confined spaces or in relatively short periods of time. Such a device also must be such that it is easy to install, simple in construction, not harmful to the dog or horse in any way, and it must permit normal let and body movements of the animal being exercised.

SUMMARY OF THE INVENTION

Accordingly, it is an object of this invention to provide an improved harness.

It is another object of this invention to provide an improved exercising harness for animals.

It is an additional object of this invention to provide an improved exercising harness which is particularly useful with dogs.

It is a further object of this invention to provide an exercising harness for animals which permits normal movement of the animal's legs, while at the same time, creating forces which improve the muscle tone and strength of the animal.

It is yet another object of this invention to provide a dynamic tension exercising device for animals, such as dogs and horses.

It is still a further object of this invention to provide an exercising harness for animals, such as dogs, which produces dynamic tension between the rear legs of the animal and the chest region of the animal to effect muscle build-up and exercising of the animal in a limited length of time and in limited space.

In accordance with a preferred embodiment of this invention, an exercising device for animals includes a harness for attachment to the chest region of the animal. First and second leg bands are attached to the rear legs of the animal. The first and second leg bands then are attached with the harness by means of resilient interconnections which cause added tension to be applied between the rear legs and the chest of the animal when the animal is walking and running in an otherwise normal manner.

BRIEF DESCRIPTION OF THE DRAWING

FIG. 1 shows a preferred embodiment of the invention in place on a dog;

FIG. 2 is a perspective view of the embodiment shown in FIG. 1; and

FIGS. 3, 4 and 5 show alternative details of a portion of the device shown in FIGS. 1 and 2.

DETAILED DESCRIPTION

Reference now should be made to the drawings in which the same reference numbers are used in the different figures to designate the same or similar components. The drawings illustrate an exercising harness for exercising a dog (as shown in FIG. 1) or a horse, by employing the principles of dynamic tension. This exercising device is capable of producing substantial muscle build-up and exercising of the animal on which it is used in a limited length of time and in limited space.

In FIG. 1, a dog 10 is shown with an exercising harness in accordance with a preferred embodiment of the invention on the dog 10 in position ready for exercise. The device comprises a harness 12 including a body-encircling strap 14, having male 15 and female 16 portions of an adjustable Velcro TM fastener on it to accommodate dogs of different girth. This fastener is shown most clearly in FIG. 2. The body-encircling strap 14 is made to be placed around the body or torso of the dog 10 immediately behind its front legs. A chest-encircling strap 17 then is connected to opposite sides of the strap 14 to extend forwardly around the chest of the dog 10. This strap further is held in place and secured to the body-encircling strap 14 by a pair of shoulder straps 20 and 21. These straps extend from a central location on the top of the body-encircling strap 14 where they cross over one another to terminate on opposite sides of the chest strap 17. A downwardly depending pulley strap 23 is attached to the center of the chest strap 17 to overlie the lower front of the chest region of the dog 10, as shown most clearly in FIG. 1. A loop 24 for attaching a leash is secured to the top of the body-encircling strap 14, so that a conventional leash 27 may be attached for controlling the dog in a normal manner.

The harness which has been described thus far is, to this point, a typical dog harness which can be used in a normal manner for exercising the dog. If, however, improved muscle build-up and extensive exercise in a relatively short period of time is desired, the remaining components shown in the drawing are employed. These additional components include a spring clip attached swivel pulley 29 which is connected to the lower end of the strap 23 and hangs downwardly from that end to a location just below the front chest region of the dog between its front legs. Once again, this is shown most clearly in FIG. 1. A pair of hock-encircling straps 30 and 31 are attached to opposite ends of an elastic cord 33 which passes over the pulley 29 (as shown most clearly in FIG. 2). The straps 31 are removably attached to the hocks on the rear legs of the dog (or horse) in the manner shown in FIG. 1.

The attachment of the straps 30 and 31 may be accomplished in a number of different ways, some of which are shown in FIGS. 3, 4 and 5. For example, in the arrangement illustrated in detail in FIG. 3, the elastic cord 33 may be removably attached to one side of the hock-encircling straps 30 and 31, as shown in FIG. 2, by means of a spring clip 35 attached to a ring 37 which passes through an eyelet in one end of the corresponding strap 30 and 31. Prior to attaching the clip 35 to the ring, however, the strap 30 or 31 is placed over the dog's hock with the opening 38 located as shown in FIG. 1. The ring 37 then is pulled through the slot 36 in the other end of the strap 30 or 31. When the clips 35 have tension applied to them by the cord 33, the straps are held snugly in place on the dog's hocks.

The length of the elastic cord 33, which passes from one strap 30 through the pulley 29 to the other strap 31, is selected to be such that in its relaxed or lowest tension state, the dog must stand with one rear leg forward of the other (as shown in FIG. 1) if no tension or only minimum tension is to be exerted through the elastic cord 33 between the rear legs of the dog and its chest. When the dog is walked, with the device in place as described above, the elastic cord 33 is stretched from a point of minimum tension to a point of maximum tension as the dog's stride changes, creating a dynamic tension or pull between the back legs of the dog and its chest.

Practically all of the muscles of the dog are exercised during the course of a simple walk with the device attached. The cord 33 alternately stretches and retracts (as indicated by the arrows in FIG. 1) to produce the tension which builds up the dog's strength. The result is a muscular toning and building-up of the back legs, back muscles, withers, chest, front legs, and the forecrest or region between the front legs of the dog.

To facilitate installation and removal of the exercising portion of the device shown in the drawings, a spring clip is used to attach the pulley 29, and a variety of removable fasteners may be used in conjunction with the straps 30 and 31 to attach the cord 33 to the rear legs of the dog. One of these variations has been described in conjunction with FIG. 3. Another variation of this attachment is shown in FIG. 4. Here, a standard spring-loaded clip is passed through the ring 37. The other end of the clip is secured to the cord 33 in any suitable manner, such as by attaching it directly to the loop or ring in the end of the clip 40.

For a given dog with a given tension or cord 33, the length of the cord may be adjusted initially and permanently attached to the straps 30 and 31 by means of the clips 35 or 40. Normally, however, it is desirable to be able to adjust the length of the cord 33. This permits the device to be used on different dogs and also permits an increase or decrease in the amount of tension to be used for a given dog. For example, when exercising of the dog first commences, a relatively light tension is desirable. As the dog's strength and muscle tone improves, however, it may be desirable to increase the amount of tension produced by the cord 33 to thereby continuously build up the strength of the dog by a series of stages. The ultimate tension which is applied by the cord 33 in such an exercise program would be far too great for the same dog before it entered into the exercise program provided by the device.

To permit this adjustability of the length of the cord 33, a number of different techniques may be used. One of these is illustrated in FIG. 5. In FIG. 5, an open spring clip 45 is shown connected to the ring 37 of the hock strap 30 in the same manner as the clip 40 of FIG. 4. A rubber or neoprene sleeve 46, in the form of an elongated open-ended cylinder, is placed over a loop in the end of the cord 33, as shown in dotted lines in FIG. 5. In the dotted line position, the sleeve 46 is illustrated in the "unlocked" position of operation. In this position, the open loop in the cord 33 is passed through the opening in the clip 45 to be located in the position illustrated in FIG. 5. The length of the cord 33 then is adjusted by feeding or pulling the end of the cord 33 passing through the pulley 29 into or out of the sleeve 46, while oppositely pulling or feeding the free end of the cord 33 also simultaneously through the sleeve 46. When the desired length is achieved, the sleeve 46 is slid into the solid line position shown in FIG. 5, where it produces a tight frictional engagement between the clip 45 and the bight or enlarged loop in the end of the cord 33 to securely hold the cord 33 in place. At the same time, the opening in the clip 45 is closed or sealed by the sleeve 46. There are other techniques which may be used to accomplish this adjustability. What is important, however, is not the manner of making the adjustment but the capability of making such an adjustment. It is apparent that for a cord 33 of a given elasticity, the pull or tension which is exerted by the animal increases in direct proportion to decreases in the total length of the cord 33, which extends between the two hock straps 30 and 31 through the pulley 39.

By use of any of the connecting devices for the hock straps 30 and 31 and the spring clip attached pulley 29, it is apparent that the exercising device portion of the exercising harness quickly and easily may be attached to the dog and the harness portion for exercising, and just as quickly and easily, may be removed when the exercising function no longer is desired. When the spring clip holding the pulley 29 is operate to release the pulley, and the hock straps 30 and 31 are removed, the remainder of the harness may be used in conjunction with the leash 27 in a conventional manner.

The result which is attained by the exercising device which has been described is akin to that which would be accomplished by attaching a heavy weight by means of a rope to the lower end of the strap 23 and then causing the dog to walk or run forward while dragging the weight. That, of course, is impractical.

Another advantage of the exercising device which has been described is that when the dog wishes to rest, it readily may do so by lying down in the normal manner. When this is done, there is no tension on any portion of the cord 33. The dog also may rest (without tension) or by standing as illustrated in FIG. 1, with one leg slightly forward of the other. Thus, it is possible for the dog to reach points of absolute rest without tension, without necessitating removal of the cord 33 from its attachment to the exercising device.

The device, as illustrated in the drawing and as described above, is to be considered as illustrative only of the invention. Various changes and modifications will occur to those skilled in the art. For example, fasteners other than the Velcro fastener 15 and 16 shown in FIG. 2 may be used for the chest-encircling strap. Also, as mentioned previously, a variety of different techniques may be used to adjust the length of the cord 33. The adjustability may be accomplished at one or both of the hock straps 30 and 31. The particular construction of the harness portion of the device which is illustrated in FIG. 1 also may be varied. It is important, however, for the chest-encircling strap 17 or its equivalent to pass over the chest region of the dog and to be held in place when tension is exerted downwardly on it when the device is in use.

We claim:

1. An exercising device for animals, including in combination:

harness means for attachment to the chest region of an animal, said harness means comprising a body encircling portion located behind the front legs of the animal and encircling the lower chest and shoulder thereof, a chest strap connected to said body encircling portion and extending over the front of the chest of the animal below the neck region, and connecting straps extending from the top of said body encircling portion on opposite sides of the animal to a location near the front of said chest strap;

first and second leg bands for attachment to the rear legs of the animal;

means for resiliently interconnecting said first and second leg bands with the central portion of said chest strap of said harness means to cause added tension to be applied between the rear legs and the chest of the animal when the animal is walking and running, while at the same time, permitting normal movement of such animal.

2. The combination according to claim 1 wherein said resilient interconnecting means applies a predetermined spring tension between the legs and chest of the animal when the animal is walking and running, with removal of said tension when the animal is a standing or relaxed position.

3. The combination according to claim 1, further including means for attaching a leash to said harness means.

4. The combination according to claim 2 wherein said leash attaching means is attached to the top of said harness means.

5. The combination according to claim 1 wherein said first and second leg bands are adapted to be placed on the hocks of the rear legs of the animal.

6. The combination according to claim 5 wherein said resilient interconnecting means applies a predetermined spring tension between the legs and chest of the animal when the animal is walking and running, with removal of said tension when the animal is a standing or relaxed position.

7. The combination according to claim 1 wherein said added tension provided by said resilient interconnecting means is a predetermined added tension.

8. The combination according to claim 7 wherein said resilient interconnecting means comprises elastic cord means.

9. The combination according to claim 8, further including pulley means attached to the central portion of said chest strap of said harness means, and wherein said elastic cord means comprises a single elastic cord connected from said first leg band through said pulley means to said second leg band.

10. The combination according to claim 9 wherein said elastic cord has the unextended length thereof selected to cause the animal to stand with one hind leg forward of the other when no tension is applied to said cord, so that during walking and running, said elastic cord is stretched to apply said predetermined added tension.

11. The combination according to claim 10, further including means for releasably attaching said pulley means to said harness and for releasably attaching said cord to said first and second leg bands.

12. The combination according to claim 11 wherein said first and second leg bands are adapted to be placed on the hocks of the rear legs of the animal.

13. The combination according to claim 12 wherein said predetermined tension is adjustable from a minimum amount to an increased amount.

* * * * *